Figure 1:
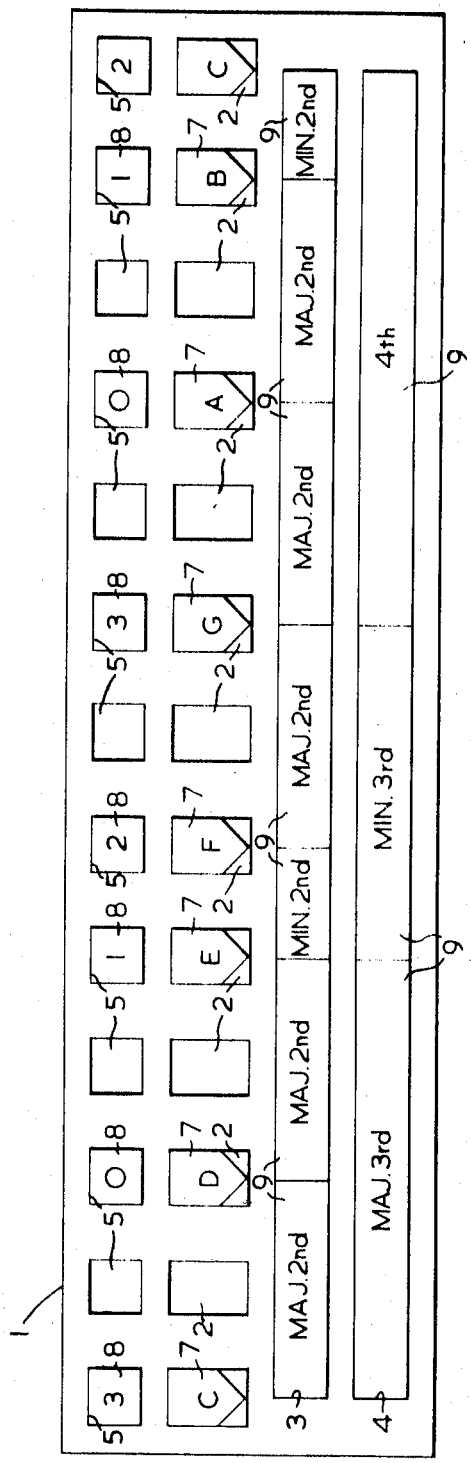

United States Patent

[11] 3,581,618

[72] Inventor Michel B. Perrault
 4200 Sherbrooke West, Apt. 20, Montreal 215, Quebec, Canada
[21] Appl. No. 857,903
[22] Filed Sept. 15, 1969
[45] Patented June 1, 1971
[32] Priority Aug. 8, 1969
[33] Canada
[31] 059,046

[54] MUSICAL INTERVAL INDICATOR
 4 Claims, 4 Drawing Figs.
[52] U.S. Cl. .................................................. 84/477, 84/485
[51] Int. Cl. .................................................. G09b 15/02
[50] Field of Search .................................................. 84/470, 477, 471, 485, 473, 476, 474, 482

[56] References Cited
 FOREIGN PATENTS
 715,321 1954 Great Britain ................ 84/473

Primary Examiner—Stephen J. Tomsky
Assistant Examiner—John F. Gonzales
Attorney—Stevens, Davis, Miller and Mosher ABSTRACT: To enable musical intervals to be taught to young children, a musical indicator includes a body with an upper face having a row of equally spaced recesses, and a channel extending parallel to the row over the length of the row, a series of note-indicating elements each positionable in a recess and each representing a musical note, and a series of interval-indicating elements of different lengths positionable in the channel, the length of each interval-indicating element corresponding to the length of the musical interval it represents. Thus, once a scale has been set up by placing note-indicating elements in appropriate recesses, a child can readily determine the musical interval between adjacent notes by finding which interval-indicating element when fitted in the channel will extend from one note to the other. Similarly, by knowing the intervals between adjacent notes, a child can dispose the note-indicating elements in the appropriate recesses. Intervals between nonadjacent notes can also be determined in this way.

MUSICAL INTERVAL INDICATOR

This invention relates to musical indicators, and it is an object of the invention to provide a musical indicator for teaching musical intervals to young children.

According to this invention, a musical indicator includes a body with an upper face having a row of equally spaced recesses, and a channel extending parallel to the row over the length of the row, a series of note-indicating elements each positionable in a recess and each representing a musical note, and a series of interval-indicating elements of different lengths positionable in the channel, the length of each interval-indicating element corresponding to the length of the musical interval it represents.

Thus, once a scale has been set up by placing note-indicating elements in appropriate recesses, a child can readily determine the musical interval between adjacent notes by finding which interval-indicating element when fitted in the channel will extend from one note to the other. Similarly, by knowing the intervals between adjacent notes, a child can dispose the note-indicating elements in the appropriate recesses. Intervals between nonadjacent notes can also be determined in this way.

The body may have a second channel extending parallel to the first channel to enable intervals between adjacent notes to be indicated in one channel and intervals between nonadjacent notes to be indicated in the other channel.

A second row of recesses parallel with the first row may be provided in the body, with each recess of the second row being laterally aligned with a corresponding recess of the first row, a series of finger-indicating elements, each positionable in one of the second recesses, also being provided to enable the necessary fingering for a musical instrument to be indicated for the various notes.

Figure 2:
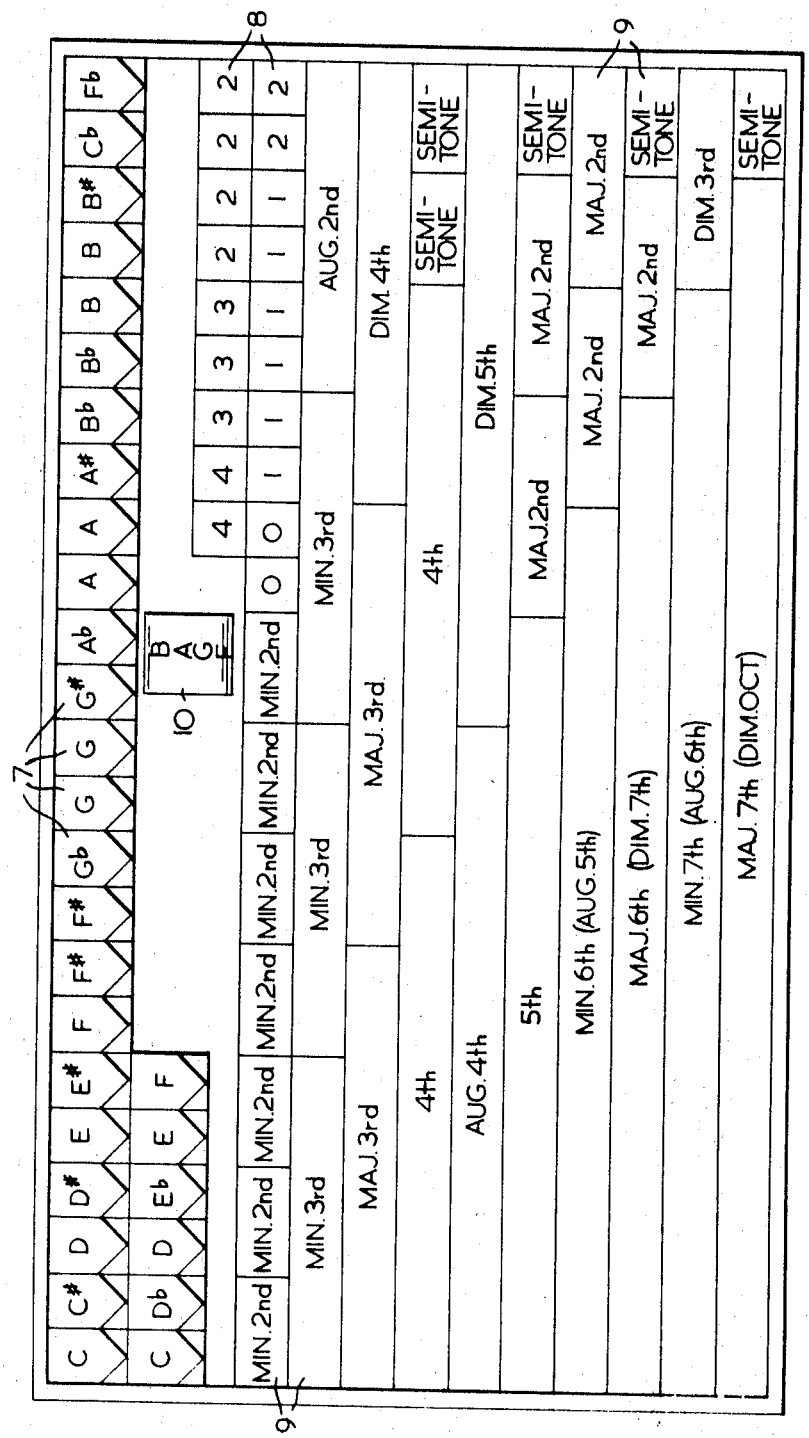
Figure 3:
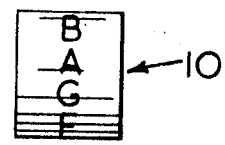
Figure 4:
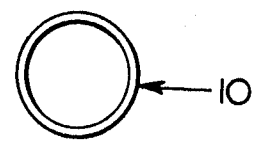

One embodiment of the invention will now be described, by way of example, with reference to the accompanying drawings, of which, FIG. 1 is a plan view of the body of a musical indicator with various elements located therein, FIG. 2 is a plan view of a box into which all the elements fit, and FIGS. 3 and 4 are front and side views respectively of a note-teaching element.

Referring to the drawings, a musical indicator has a body 1 (FIG. 1) with a row of equally spaced rectangular recesses 2 in its upper face, there being 13 recesses in all, each representing a semitone. Two channels 3, 4 in the body 1 extend in spaced parallel relationship to the row of recesses 2 over the length of the row. Each channel 3, 4 terminates at a position level with the midpoint of the length of the end recesses 2. A second row of recesses 5 extends in spaced parallel relationship to the row of recesses 2, each recess 5 being laterally aligned with a corresponding recess 2. Each recess 5 is square and is equal in length to the length of each recess 2.

FIG. 2 shows a box 6 into which all the various elements fit. There are 30 note-indicating elements 7, each indicating a note of the musical scale, some of the notes being duplicated for use at the extremities of the octave. Each note-indicating element 7 will fit into a recess 2, and has a pointed end to clearly indicate the midpoint of the length of the recess 2. There are 19 finger-indicating elements 8, each indicating a number from zero to four and each dimensioned to fit into a recess 5. There are two finger-indicating elements 8 marked zero, and each of these have the number five on their reverse faces. The zero is used when indicating fingering for the violin, and the five is used for piano fingering. Also, there are 34 interval-indicating elements 9 dimensioned to fit into the channels 3, 4. As can be seen from FIG. 2, the elements 9 are of varying length, the length of each element 9 corresponding to the length of the musical interval it represents. There is also a note-teaching element 10.

FIG. 1 shows one use of this embodiment. The scale of C major has been set up in the row of recesses 2 by use of the appropriate note-indicating elements 7. The first channel 3 has been used to show the intervals between adjacent notes in terms of full tones and semitones. The second channel 4 has been used to show an interval of a major third between the first and third notes, a minor third between the third and fifth notes, and a perfect fourth between the fifth and eighth notes. The finger-indicating elements 8 indicate for each note the fingering to be applied in the first position on the violin.

Thus, it will readily be seen that any musical scale can easily be set up in the body 1, and a pupil can easily find the various musical intervals involved and can also indicate the necessary finger rings for a given instrument. Similarly, any chord can be set up in the body 1, once the pupil has learnt the sizes of all musical intervals.

FIGS. 3 and 4 show the note-teaching element 10, which is in the form of a cylinder and has the seven natural notes A,B,C,D,E,F and G indicated around its cylindrical surface in equispaced relationship. By rotating the cylinder, a child can readily learn the order of the notes, in either direction and starting from any note.

Although the note-teaching element 10 is shown as a hollow cylinder, it could of course be solid if desired. Also, instead of being circular in cross section, the note-teaching element 10 could have a cross section in the form of a seven-sided polygon, with one note indicated on each of the seven faces.

The musical indicator according to this invention is especially useful for the examination of surface musical operation, whereas the musical indicator which is the subject of my other application, Ser. No. 857,904, filed Sept. 15, 1969 entitled "Linear or Rotary Musical Indicator" is especially useful for the examination of structural musical operation.

I claim:

1. A musical indicator including a body with an upper face having a row of equally spaced recesses, and a channel extending parallel to the row of recesses over the length of the row, a series of note-indicating elements each positionable in a recess and each representing a musical note, and a series of interval-indicating elements of different lengths positionable in the channel, the length of each interval-indicating element corresponding to the length of the musical interval it represents.

2. A musical indicator according to claim 1 wherein the body has a second channel extending parallel to the first channel, and in which the interval-indicating elements are positionable.

3. A musical indicator according to claim 1 wherein the upper face of the body has a second row of recesses parallel with the first row, each recess of the second row being laterally aligned with a corresponding recess of the first row, and a series of finger-indicating elements, each positionable in one of the second recesses, is provided to enable the necessary fingering for a musical instrument to be indicated for each note.

4. A musical indicator according to claim 1 wherein the note-indicating elements each have a pointed end to indicate the midlength position of each recess.